Feb. 8, 1955         H. L. RIESS         2,701,478
NONJAMMING STOP AND OVERLOAD CONTROL FOR ACTUATORS
Filed Oct. 27, 1949
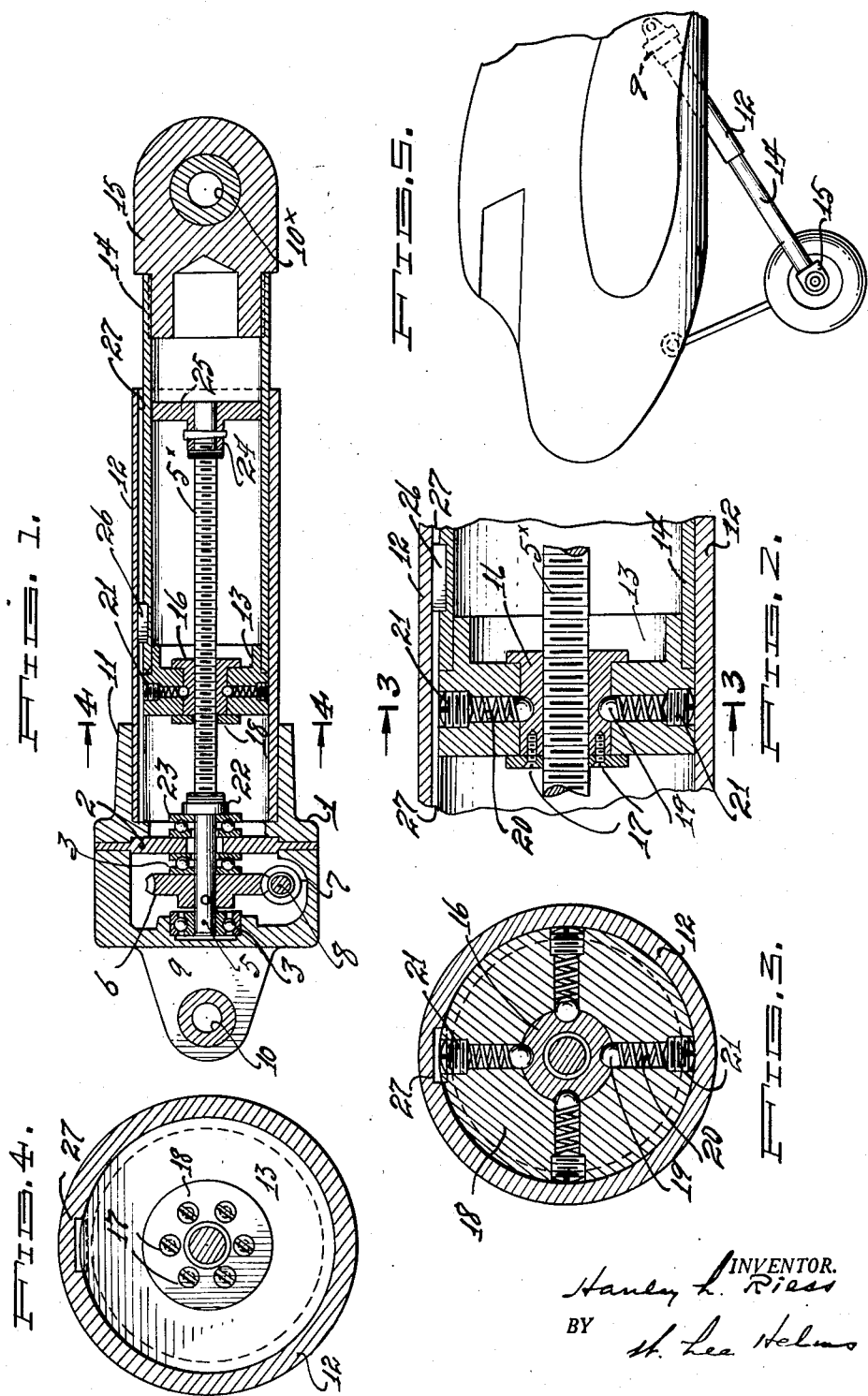

United States Patent Office 2,701,478
Patented Feb. 8, 1955

2,701,478

NONJAMMING STOP AND OVERLOAD CONTROL FOR ACTUATORS

Hanley L. Riess, Bellerose, N. Y.

Application October 27, 1949, Serial No. 123,853

2 Claims. (Cl. 74—424.8)

The present invention relates to a non-jamming stop and overload control for actuators generally, the invention being particularly applicable to those actuators employed on aircraft to operate landing gear, wing flaps, rudder and elevator trim and cowl flaps. In such applications of electrical actuators it is highly important that the actuator be of simple and highly effective form, capable of repeated operation without derangement, and that means be provided for the prevention of jamming and the provision of overload controls. Manifestly such controls should be positive, simple in form, and have long life. It is the object of the present invention to meet these conditions by an improved non-jamming stop and overload control.

The invention will be described with reference to the accompanying drawings, in which:

Fig. 1 is a longitudinal section through an electrical actuator embodying the invention;

Fig. 2 is an enlarged fragmentary view showing a central area of the structure illustrated in Fig. 1;

Fig. 3 is a transverse section on the line 3—3 of Fig. 2;

Fig. 4 is a transverse section on the line 4—4 Fig. 1;

Fig. 5 is a fragmentary view showing in side elevation the forward portion of an airplane with a wheel and wheel retractor means, the latter, including an electrical actuator, being shown schematically in both full and dotted lines.

Referring to Fig. 1 of the drawings, it will be seen that the actuator therein illustrated consists of a primary casing 1 having a division wall 2. Rearwardly of the division wall, and rotating in bearings 3, is the rear portion of a shaft 5. On shaft 5 is a worm-gear 6 driven by a worm 7 on a shaft 8. Shaft 8 will be driven by an electric motor as customarily in such cases. The said primary casing member is formed with a rear extension 9 having a reinforced aperture 10 to receive securing means by which the actuator is held to a frame member of the airplane fusilage or to such other appliance as required.

The primary casing is formed with a forwardly projecting sleeve 11 which receives, and is secured to, a cylinder 12. Within the cylinder is a piston of special form now to be described. The piston consists of a member 13 which is reduced toward one end to provide a shouldered ring upon which is secured the sleeve 14. The sleeve 14 carries at its outer end a head 15 which is apertured at $10^x$ for connection with the element to be actuated.

Piston member 13 is formed with a relatively large axial aperture. Into this aperture is rotatably received an internally threaded nut 16. The nut is shouldered at one end to abut the outer face of piston member 13. At its opposite end the nut has secured thereto, as by the screws 17, a holding disk 18.

By reference to Figs. 2 and 3 it will be seen that nut 16 is formed with depressions or seats to receive a plurality of spring pressed friction elements which serve to clutch together the nut and piston element 13 in all normal operation. In the present embodiment the clutch elements consist of steel balls 19 held in a plurality of axial apertures formed in piston member 13. Pressing upon each ball 19 is a spring 20. Each spring is caged by means of a screw plug 21.

The internally threaded nut is received upon the exteriorly threaded shaft or screw section $5^x$ of shaft 5. In practice shaft section $5^x$ may be separately formed and fixed within the housing member 22 secured to one end of shaft section 5 and in abutment with a bearing assembly shown at 23. The screw section $5^x$ is, in the present embodiment, seated within the hub 24 of a disk or like functional member 25 supporting, and within, cylinder 14 as clearly shown in Fig. 1.

Any suitable means may be provided for permitting endwise movement of the cylinder without rotation thereof. In Figs. 1 and 2 such means consists of a key 26 carried by the outer wall of the cylinder and sliding in a channelway at 27 in the sleeve 12.

When normally operated and controlled by the fullclosed and full-open limit switch (not shown) and which will be located in the motor-power supply, the nut 16 will be caused to travel on the screw $5^x$ and thereby will carry the piston 21, sleeve 14 and head 15 as one unit. This action is caused inasmuch as the compressive action of the spring press balls will be predetermined as greater than the load. The result is a clutched condition between the nut and the elements driven thereby so that the mechanism will move the sleeve forwardly and backwardly as required. In the case of a limit switch failure at the full throw of the sleeve outwardly or inwardly, the nut will reach one of the stop elements 22 or 24 at the end of the screw and continued rotation of the screw in the same direction will increase the torque since the nut is held against further longitudinal movement, with the result that the balls will be forced out of the half holes or depressions in the nut into the recesses of the hardened piston 13, with compression of the sleeves. This will disconnect the nut from the piston and the nut will idly rotate with the screw, the balls alternately moving into and out of the nut, so that jamming, breaking or shearing of any part of the actuator will be rendered impossible. As soon as the direction of rotation of the screw is reversed, the torque will become less than the clutching action of the spring press balls, so that the tension of the springs will keep the balls in clutching position with respect to the nut, and the latter will have its normal operation.

In the case of an overload, which means that the load carried by the actuator exceeds the predetermined torque limit, which would cause shearing or breakage of parts, the clutch connection between the nut and the sleeve will not carry the overload and therefore the balls will be forced out of the seats therefor and the nut, and the nut will turn freely with the screw until normal loads are reached.

It will be understood that various modifications may be made in the form and arrangement of the elements illustrated in the drawings without departing from the spirit of the invention.

For example, the relative positions of the spring and ball receiving chambers and the seats for the balls can be reversed. In other words, the chambers and springs may be carried by the nut rather than by the piston.

Having thus described my invention, what I claim and desire to secure by Letters Patent is as follows:

1. An actuator comprising a first member, a second member slidably mounted with respect to said first member, attaching means on said members for securing each of the latter to a respective element of a device which is to be actuated, a shaft rotatably mounted with respect to said first member but fixed against longitudinal movement with respect thereto, said shaft extending in a direction coincident with the direction of sliding movement of said second member, driving means for rotating the shaft, keyway means for sliding said second member into and out of said first member in the absence of rotation of said second slidable member, a nut mounted on said shaft and in threaded engagement therewith, normallyengaged clutch means drivingly connecting the nut and the second member, and means for automatically disengaging said clutch means in response to the attainment of a predetermined torque on said shaft and automatically re-engaging said clutch means when less than said predetermined torque is applied to said shaft.

2. A nut-clutch combination comprising a nut having a flange and an interiorly threaded aperture for engaging a screw shaft, said nut having a plurality of circumferential and spaced hemispherical depressions adapted to engage balls, an annulus surrounding said nut and containing a plurality of longitudinal bore holes therein and adapted to hold a tensioned spring and a steel ball of lesser diameter than the diameter of said bore holes, and a holding disk whereby said annulus is retained between the flange of said nut and said holding disk thereby permitting travel of the nut and annulus until an abutment is reached whereupon the spheres become unseated from their depressions preventing stripping of the screw threads on said screw shaft.

References Cited in the file of this patent

UNITED STATES PATENTS

| Number | Name | Date |
|---|---|---|
| 1,453,532 | Stevens | May 1, 1923 |
| 2,164,870 | De Salardi | July 4, 1939 |
| 2,336,877 | Matthews et al. | Dec. 14, 1943 |
| 2,465,309 | Happe et al. | Mar. 22, 1949 |
| 2,479,713 | Beach | Aug. 23, 1949 |
| 2,602,664 | Matchett | July 8, 1952 |

FOREIGN PATENTS

| Number | Country | Date |
|---|---|---|
| 20,565 | Denmark | Sept. 2, 1915 |
| 552,485 | Great Britain | Apr. 9, 1943 |